United States Patent [19]

Alexander

[11] 4,001,777
[45] Jan. 4, 1977

[54] TAXIMETER PROTECTION SYSTEM

[76] Inventor: Elmore Alexander, 726 Northampton St., Buffalo, N.Y. 14211

[22] Filed: June 21, 1974

[21] Appl. No.: 481,745

Related U.S. Application Data

[63] Continuation-in-part of Ser. No. 371,970, June 21, 1973, abandoned, which is a continuation-in-part of Ser. No. 241,992, April 7, 1972, abandoned.

[52] U.S. Cl. .............................. 340/68; 340/52 R; 180/102; 200/85 A; 340/278; 235/150.2
[51] Int. Cl.² ......................................... B60Q 1/26
[58] Field of Search ................. 340/52 E, 68, 52 R, 340/278; 180/82 E, 102; 200/61.43, 85 R, 85 A, 61.58 B; 235/30 R, 30 A, 32, 150.2

[56] References Cited

UNITED STATES PATENTS

| | | | |
|---|---|---|---|
| 3,343,624 | 9/1967 | Shaheen | 180/102 |
| 3,504,336 | 3/1970 | Boblitz | 340/278 X |
| 3,757,065 | 9/1973 | Eberle et al. | 200/85 A |
| 3,761,659 | 9/1973 | Eberle et al. | 200/85 A |
| 3,809,312 | 5/1974 | Warrick et al. | 235/30 R |

*Primary Examiner*—Alvin H. Waring
*Attorney, Agent, or Firm*—Christel & Bean

[57] ABSTRACT

A monitoring system for a vehicle for hire, such as a taxicab, including a source of direct current, electrically controlled switching means in the form of a relay, and condition responsive switching means connected to the source and to the relay. The condition responsive switching means is operated in response to tampering or other unauthorized activity with the vehicle, the fare recording meter of the vehicle, and the monitoring system itself. This in turn operates the relay causing it to change from a normal position to a fault-indicating position, for example to operate a suitale indicator such as an audible alarm or to open the vehicle operating circuit including the storage battery and ignition coil thereby disabling the vehicle. Operation of the relay disconnects the condition responsive switching means from the source thereby minimizing current drain therefrom. A test circuit including an electrically operated indicator and a normally open switch is enabled by operation of the relay whereby a subsequent inspection can be made by closing the test circuit switch. The system includes passenger detecting means operatively connected to time delayed switching means and to the fare recording meter for tripping a counter or similar registering device which records segments of time a passenger is transported in the vehicle without operation of the fare recording meter. The system also includes means allowing selective operation for flat rate fares and recording the number of such fares.

31 Claims, 11 Drawing Figures

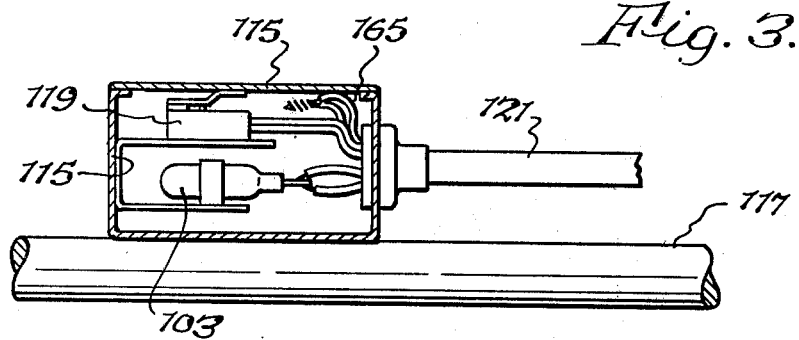
Fig. 3.
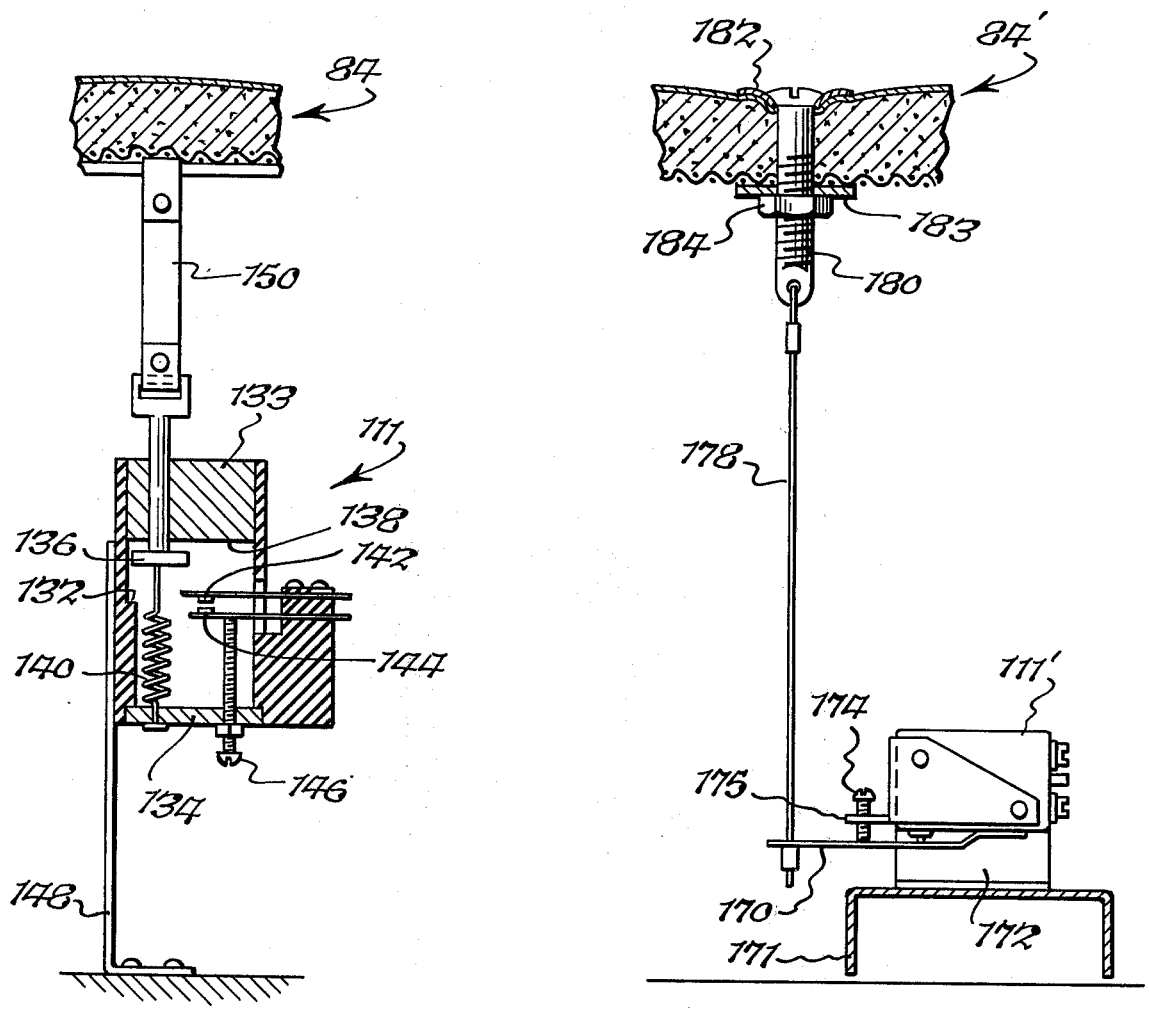
Fig. 4.
Fig. 5.

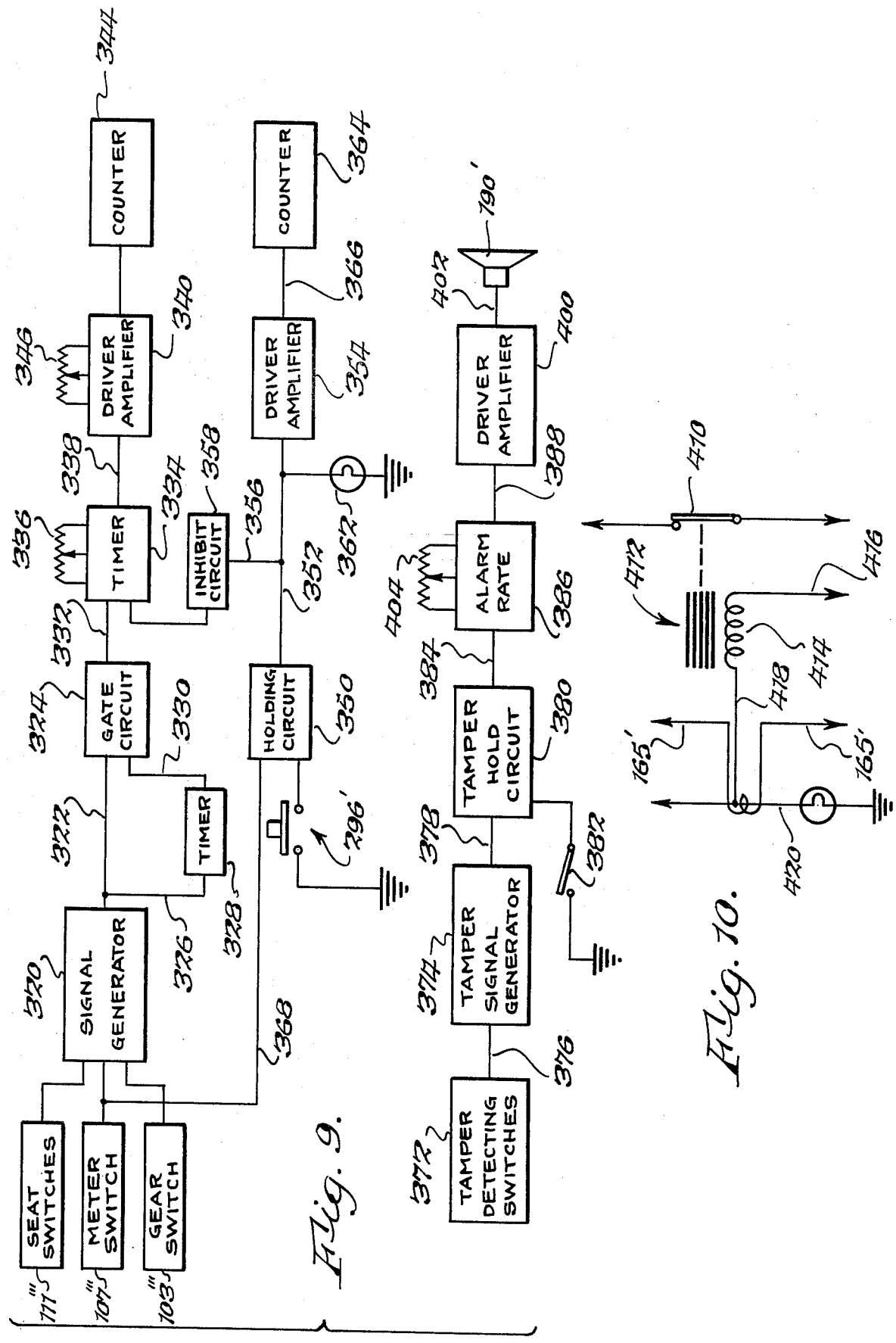

TAXIMETER PROTECTION SYSTEM

CROSS REFERENCE TO RELATED APPLICATIONS

This application is a continuation-in-part of my application Ser. No. 371,970 entitled "Taximeter Protection System" filed June 21, 1973, now abandoned, which is a continuation-in-part of my application Ser. No. 241,992 entitled "Taximeter Protection System" filed Apr. 7, 1972, now abandoned.

BACKGROUND OF THE INVENTION

This invention relates to vehicle monitoring systems, and more particularly to a new and improved electrical system providing tamper detection in a vehicle for hire.

One area of use of the present invention is in protecting the fare recording meter of a taxicab against tampering and in monitoring the meter although the principles of the invention can be variously applied. A problem faced by taxicab companies is loss of revenue when dishonest drivers tamper with their meters, or simply fail to record some fares, and then return to the company only the recorded fares while keeping the difference. While various systems have been proposed and developed for the purpose of preventing or detecting unauthorized operation of taxicabs by dishonest drivers, some of these systems can be rendered ineffective such as by cutting or severing cables which connect various parts thereof with the meter and the vehicle. The electrical power source included in some systems can be depleted relatively often thereby requiring frequent and costly replacement. In systems which disable the vehicle engine or operate a signal or alarm in response to meter tampering or other unauthorized activity, if the driver is able to restart the vehicle himself or stop the signal or alarm, the taxicab company may never learn of the tampering or unauthorized activity.

SUMMARY OF THE INVENTION

It is, therefore, an object of this invention to provide a new and improved monitoring system for a vehicle for hire.

It is a more particular object of this invention to provide such a monitoring system for a taxicab which detects and prevents tampering with the taxicab meter, parts of the vehicle, and the monitoring system itself.

It is a further object of this invention to provide such a monitoring system which operates from an electrical source in a manner resulting in relatively little current drain from the source.

It is a further object of this invention to provide a monitoring system which not only responds immediately to tampering and other unauthorized activity but also provides an indication of such activity which is revealed upon subsequent inspection of the system.

It is a further object of this invention to provide such a monitoring system which allows operation on a flat rate fare basis and which records the number of such fares in a given period of time.

It is a further object of this invention to provide such a monitoring system which is relatively simple and reliable in construction and which is convenient and easy to install and maintain.

The present invention provides a monitoring system for a vehicle for hire including a source of direct current, electrically controlled switching means connected to the source, and condition responsive switching means connected to the source and to the electrically controlled switching means. The condition responsive switching means is operated in response to tampering or other unauthorized or abnormal activity or conditions with the vehicle, the fare recording meter of the vehicle, and the monitoring system itself. This, in turn, operates the electrically controlled switching means from a normal position or state to a fault-indicating position or state. Operation of the electrically controlled switching means also disconnects the condition responsive switching means from the source thereby minimizing current drain therefrom. A test circuit is enabled by operation of the electrically controlled switching means whereby an indication of the foregoing activity or conditions is revealed upon subsequent inspection of the system. The system detects the presence of a passenger, and if an attempt is made to transport the passenger without operating the fare recording meter, a permanent record of each attempt is made, such as by triggering a counter which can register predetermined periods of time during which the violation occurred. The system allows selective operation on a flat rate fare basis and records the number of such fares in a given period of time.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 3 is a fragmentary elevational view, partly in section, or a portion of the monitoring system of the present invention;

FIG. 4 is a fragmentary elevational view, partly in section, of a passenger detecting means according to the present invention for use in the system of FIG. 1 and 2;

FIG. 5 is a fragmentary elevational view, partly in section, of an alternative passsenger detecting means for use in the monitoring system of the present invention;

FIG. 9 is a block diagram of an electronic circuit version of the monitoring system of the present invention;

FIG. 10 is a schematic circuit diagram of an alternative meter indicator and switch for use in the monitoring system of the present invention.

DETAILED DESCRIPTION OF THE ILLUSTRATED EMBODIMENT

Figure 1:
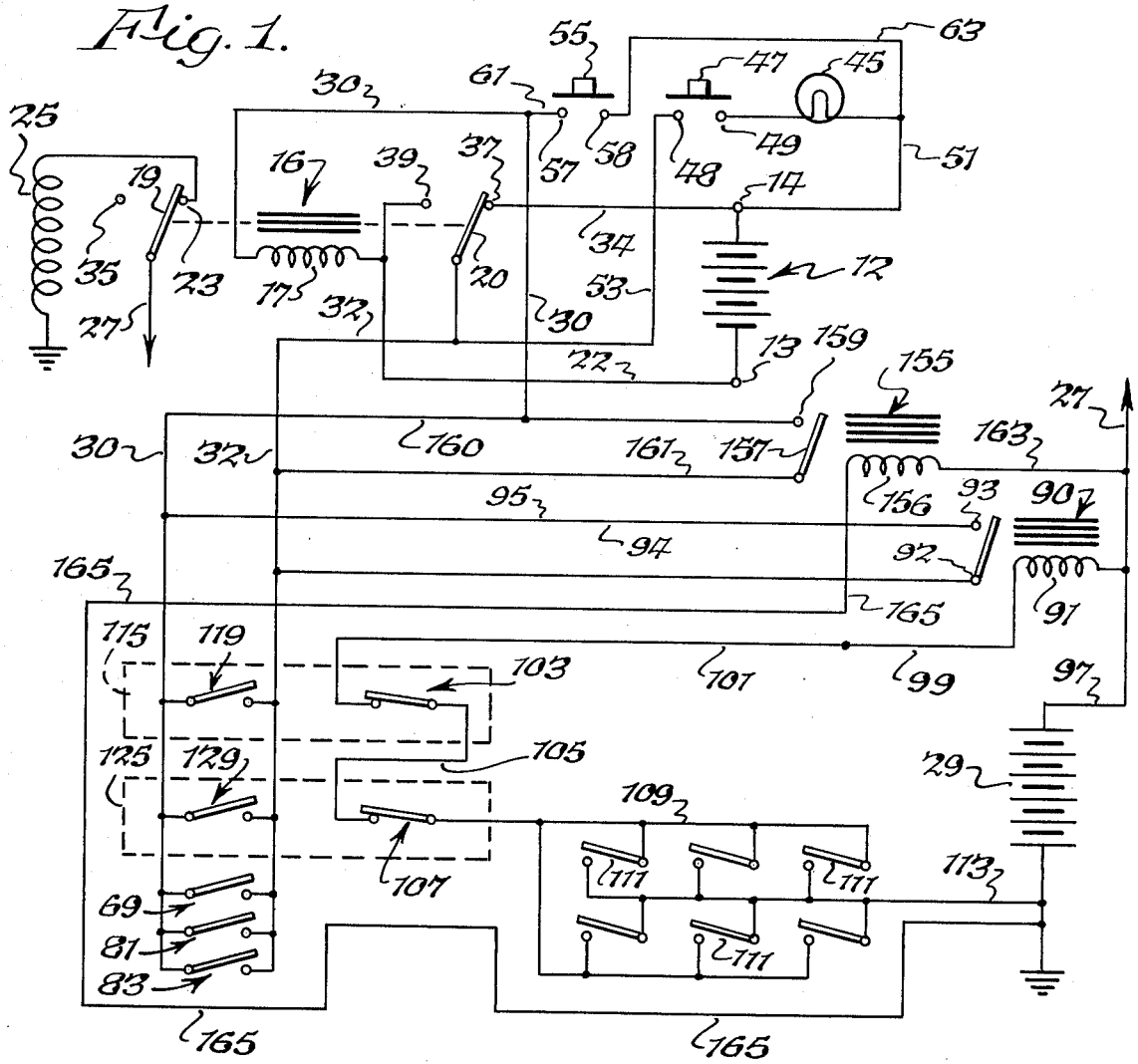
FIG. 1 is a schematic circuit diagram of a vehicle monitoring system according to one embodiment of the present invention.

Referring now to FIG. 1, the monitoring system of the present invention comprises a source of direct current in the form of a six volt battery 12 having a pair of terminals 13, 14. The system further comprises electrically controlled switching means in the form of a relay 16 having a control coil 17 and two switch arms 19, 20 operated thereby. In particular, one terminal of control coil 17 is connected by a line 22 to the negative terminal 13 of battery 12. Switch arm 19 of relay 16 normally completes the operating circuit for the prime mover of the vehicle in which the monitoring system of this embodiment is included. In particular, switch arm 19 normally engages a contact 23 connected to one terminal of conventional vehicle ignition coil 25, the other terminal of which coil is grounded. Switch arm 19, in turn, is connected by a line 27 to the positive terminal of a conventional 12 volt vehicle storage battery 29, the negative terminal of which is connected to ground in a conventional manner. The other terminal of relay coil 17 is connected to a line 30, and another line 32 is connected through relay switch arm 20 to a line 34 connected to the positive terminal 14 of battery 12.

The monitoring system of the present invention further comprises condition responsive switching means operative in response to abnormal conditions of or to tampering with parts of the vehicle, the fare recording meter, and the monitoring system to complete an electrical circuit between lines 30 and 32 and hence between battery 12 and control coil 17 of relay 16, The nature and operation of the condition responsive switching means can take various forms, all of which will be described in detail presently, suffice it to say operation of the condition responsive switching means provides a connection between lines 30 and 32.

Energization of relay coil 17 moves switch arm 19 away from contact 23 and into engagement with a contact 37 connected to line 34 and into engagement with a contact 39. As a result, operation of relay 16 opens the vehicle operating circuit including coil 25 and battery 29 and simultaneously disconnects the condition responsive switching means from the positive terminal 14 of battery 12. The monitoring system of the present invention therefore operates with relatively little current drain on the source direct current 12 included therein. A preferred form of relay 16 is a 6 volt d.c. single coil impulse latching relay such as that available from the Potter and Brumfield Co. under the designation PC 11D.

The monitoring system of the present invention further comprises a test circuit including electrically operated indicating means in the form of lamp 45 and normally open test switch means in the form of push button 47 operatively associated with contacts 48, 49. The test circuit is connected to one terminal of battery 12 by means of a line 51 connecting one terminal of lamp 45 to line 34 and hence terminal 14 of battery 12, and the test circuit is connected to relay 16 by means of a line 53 connecting switch contact 48 to switch arm 20 of relay 16. With switch arm 20 of relay 16 in the position shown in FIG. 1, depression of switch button 47 to engage contacts 48, 49 does not energize lamp 45. When relay 16 has been operated by the condition responsive switching means, relay switch arm 20 engages contact 39 which is connected to battery terminal 13, therby completing a circuit including battery 12 and the test circuit so upon operation of the test switch hereby button 47 engages contacts 48, 49, lamp 45 is energized thereby indicating that relay 16 has been operated by the condition responsive switching means in response to an abnormal condition of the vehicle, the meter or the monitoring system. As a result, the fact that an abnormal condition has occurred can be detected easily at any desired time thereafter and without any need to disassemble the monitoring system and with little current drain on battery 12.

The monitoring system of the present invention further comprises reset switch means in the form of a switch button 55 operatively associated with switch contacts 57, 58 connected to relay 16 and battery 12 for returning relay 16 to its original state. In particular, switch contact 57 is connected by a line 61 to line 30 and hence to one terminal of relay coil 17, and switch contact 58 is connected by means of a line 63 and by lines 51 and 34 to terminal 14 of battery 12. Depression of switch button 55 into engagement with contacts 57, 58 completes an electrical circuit including relay coil 17 and battery 12 thereby operating relay 16 to return switch arms 19 and 20 to their original positions closing the vehicle operating circuit and connecting the condition responsive switching means to battery 12.

Figure 2:
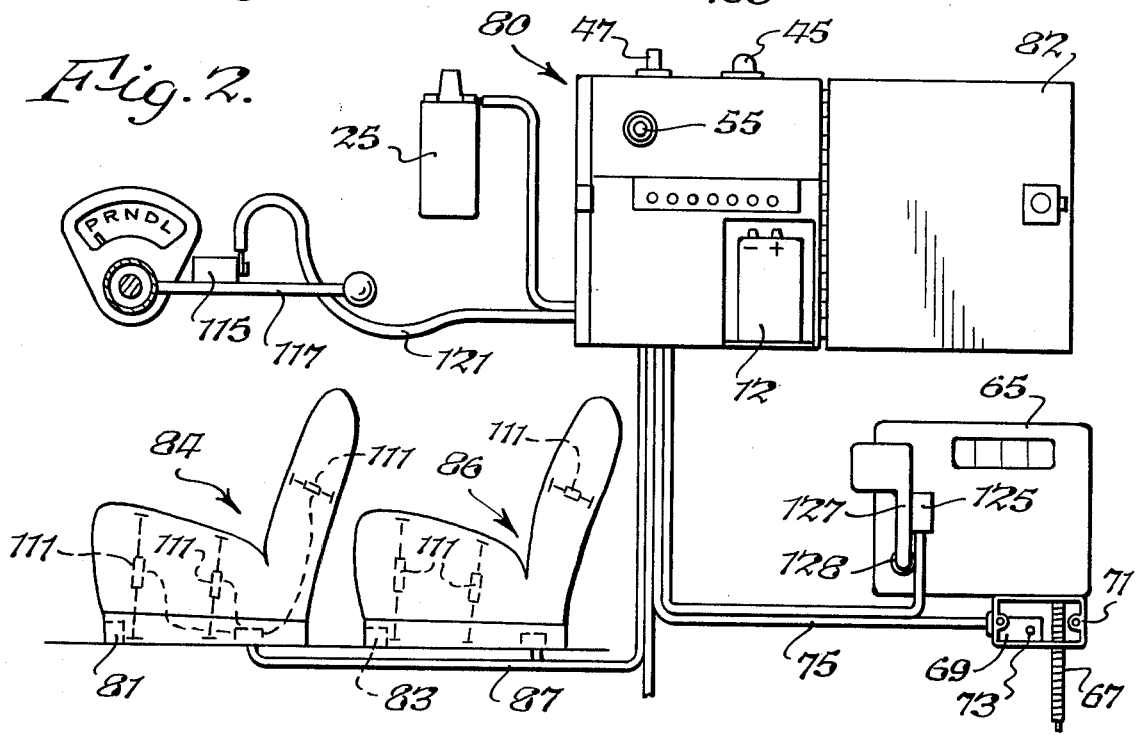
FIG. 2 is an elevational view illustrating installation of the monitoring system of the present invention in a vehicle for hire.

In one aspect of the present invention, the condition responsive switching means comprises normally open mechanically operated switching means positioned so as to be closed in response to movement of components in the vehicle and in the monitoring system during tampering therewith. In particular, and referring also to FIG. 2, a conventional fare recording meter as found in taxicabs is shown at 65 and a cable 67 connects meter 65 to a source of electrical power or to the vehicle odometer. Tampering with the connection of cable 67 to meter 65 is prevented by mounting a normally open micro switch 69 in a box or housing 71 mounted on the meter 65 and surrounding the cable connection in a manner such that when a cover is connected on box 71, the arm or lever 73 of micro switch 69 is moved so as to maintain switch 69 in an open condition. A cable means 75 connects switch 69 to lines 30, 32 of the monitoring system which are located within a housing 80 as shown in FIG. 2. Thus if the cover of box 71 is removed, switch 69, closes to connect lines 30, 32. Additional micro switches 81, and 83 can be positioned under the front and rear seats 84 and 86, respectively, of the vehicle in a manner such that the switches close when removal of the seats from the vehicle is attempted. One reason for providing switches 81 and 83 is to prevent tampering with passenger detecting switches included in these seats 84, 86 which will be described in detail presently. A cable 87 connects switches 81, 83 to lines 30, 32 in housing 80. Additional switches can be installed in the vehicle and monitoring system in a manner similar to that of switches 69, 81 and 83 in accordance with the spirit and scope of the present invention.

In another aspect thereof, the condition responsive switching means of the present invention comprises electrically controlled switching means including time delay means in the form of a time delay relay designated 90 in FIG. 1. One form of variable time delay relay 90 found to perform satisfactorily in the system of the present invention is a 12 volt d.c. relay marketed by Potter and Brumfield under the designation R12-30-12-X2-E1. Time delay relay 90 is energized by means including passenger detecting means and normally closed switching means under control of the vehicle operator or driver whereby relay 90 is operated a predetermined time after a passenger is seated in the vehicle unless the driver or operator opens one of the switching means under his control. In particular, relay 90 has a control coil 91, which, when energized, causes movement of a switch arm 92 from the position shown in FIG. 1 into engagement with a contact 93. Switch arm 92 is connected by a line 94 to line 32, and contact 93 is connected by a line 95 to line 30 whereby operation of relay 90 makes connection or completes a circuit between lines 30 and 32. One terminal of relay coil 91 is connected by a line 97 to the positive terminal of vehicle storage battery 29. The other terminal of control coil 91 is connected by a line 99 and through the passenger detecting means and operator-controlled switching means to the negative terminal of vehicle storage battery 29 in a manner which will now be described.

Line 99 is connected by means of a line 101 to a first normally closed switch 103 which can be opened manually by the operator or driver of the vehicle. Switch 103 is connected by a line 105 in series with a second normally closed switch 107 which also can be opened manually by means of the vehicle driver. Switch 107 is connected by a line 109 through a plurality of passenger detecting means in the form of normally open switching means, for example switches 111, mounted in the seats of the vehicle in a manner so as to be closed when a passenger sits on the vehicle seat. In preferred form switches 111 are arranged or connected so that closure of any one of the switches 111 makes a connection or completes a circuit from line 109 to a line 113 connected to the negative terminal of vehicle storage battery 29. As a result, when a passenger sits on a seat of the vehicle, one or a number of these switches 111 is closed thereby completing a circuit including vehicle storage battery 29 and relay 90. After a predetermined time, for example about 15 seconds, switch arm 92 is moved into engagement with contact 93 thereby connecting lines 30, 32 to energize relay 16 and ultimately disable the vehicle. The foregoing sequence of events will occur unless the vehicle driver opens either the switches 103 or 107.

Referring now to FIGS. 2 and 3, switch 103 is in the form of a position responsive switch such as the type containing mercury or other similar conducting liquid which makes electrical connection between two switch contacts when the entire switch is oriented in a particular position or within a range of positions. Switch 103 is suitably mounted within a receptable 115 which, in turn, is mounted on the vehicle gear shift lever 117 as shown in FIG. 2. Alternatively, the switch and receptacle can be mounted on the gear shift column so as to be as close as possible to the pivot axis of the gear shift lever to sense the position of the lever. As a result, switch 103 can be set or adjusted so that it opens when lever 117 is moved to a position corresponding to a non-motion gear of the vehicle such as the park gear. The arrangement also could be effective with switch 103 adjusted to open whenever lever 117 is placed in the neutral, reverse or park positions. A micro switch 119 can be positioned within receptacle 115 as shown in FIG. 3 so that after the receptacle cover is secured thereon switch 119 is in a normally open position, but switch 119 will close upon removal of the receptacle cover such as during tampering. A cable 121 connects switches 103 and 119 to the housing 80 of the monitoring system. Alternatively, switch 103 and the connecting wires can be sealed or encapsulated by epoxy material within a plastic housing which in turn is mounted on lever 117 or the column. This obviates the need to switch 119 and reduces size of the components.

Switch 107 also is a position responsive switch containing mercury of suitable liquid condutor identical to switch 103, and it is placed within a receptacle 125 which is attached to the actuating or control means of meter 65 in the form of a manually operated flag member 127 connected to a shaft 128. Switch 107 is adjusted within receptacle 125 so as to be closed when meter flag 127 is in the non-recordng position shown in FIG. 2 and to be opened when flag 127 is pivoted or moved downwardly to a fare recording position in the usual manner. Alternatively, switch 107 and its receptacle 125 can be mounted on shaft 128 so as to be actuated upon pivoting of shaft 128. A micro switch 129 can be included in receptacle 125 in a manner identical to the installation of micro switch 119 in receptacle 115. Cable 75 also connects switches 107 and 129 in receptacle 125 with components in the housing 80. If desired switch 107 can be encapsulated in a plastic container mounted to flag 127 or shaft 128 in a manner similar to the alternative arrangement for switch 103 thereby eliminating the need for switch 129.

A passenger detecting switch 111 constructed according to the present invention is shown in detail in FIG. 4. Switch 112 comprises a housing 132 which can be rectangular or cylindrical in shape having a top end member 133 and a bottom end member 134 as viewed in FIG. 4. Top end member 133 is provided with an opening to slidably receive a plunger member 136, and movement of plunger 136 in a direction toward member 133 is limited by a stop member 138 attached to the inner surface of housing 132 and positioned to engage a surface of plunger 136 as shown in FIG. 4. A spring 140 urges plunger 136 in a direction away from stop member 138 and toward a pair of switch contacts 142, 144 in housing 132 each comprising a resilient metal strip and each having a terminal which is accessible externally of housing 132. Switch contacts 142, 144 are spaced apart a distance which is variable by means of an adjustment screw 146 whereby rotation of screw 146 moves contact 144 toward or away from contact 142 thereby varying the distance therebetween.

Each switch 111 is installed in the following manner. Housing 132 is secured in the vehicle seat on framework thereof by means of a bracket 148 fixed to housing 132 and extending from end member 134. With housing 132 anchored by means of bracket 148, plunger 136 is pulled against spring 140 so that it is in engagement with stop 138, and plunger 136 is anchored by a flexible means in the form of a strap 150 or similar flexible connecting means near the inner surface of the seat surface against which the passenger sits. In particular, strap 150 can be anchored on a rod or on a portion of the seat spring or through the padding near the surface of the seat. Once this is done, the switch is adjusted for sensitivity by means of screw 146 to increase or decrease the gap or distance between contacts 142, 144 enabling even the slightest surface pressure on the seat to be detected.

According to another aspect of the present invention, the condition responsive switching means comprises normally open electrically controlled switching means in the form of relay 155 having a control coil 156 which when energized moves a switch arm 157 from the position shown in FIG. 1 into engagement with a contact 159. A line 160 connects contact 159 to line 30 and a line 161 connects switch arm 157 to line 32. One terminal of the control coil 156 is connected by means of a line 163 and line 97 to the positive terminal of vehicle storage battery 29. The other terminal of control coil 156 is connected by a line 165 to the negative terminal of vehicle storage battery 29. In accordance with this invention line 165 is located within each of the cable means connecting a portion of the monitioring system contained within housing 80 with the remaining portions of the system located in parts of the vehicle, for example cables 75 and 87 shown in FIG. 2. This can be seen in further detail by referring also to FIG. 3 which shows line 105 positioned in cable 121. Line 165 normally completes an energizing circuit for relay coil 156, but if any of the cables should be cut or severed, line 165 is broken thereby opening the energizing circuit for relay 156 resulting in movement of switch arm 157 into engagement with contact 159. This, in turn, causes operation of relay 16 in a manner similar to that described above. The foregoing also will occur if vehicle storage battery 29 is disconnected so that this aspect of the system of the present invention also protects against removal or disconnection of the vehicle storage battery.

FIG. 5 shows an alternative passenger detecting means which can be used in the monitoring system of the present invention. The passenger detecting means is in the form of normally open switching means, here designated 111, mounted in the seats of the vehicle such as seat 84 in a manner so as to be closed when a passenger sits on the vehicle seat. Switching means 111 is in the form of a micro switch having a switch arm 170. Switch 111 is mounted on a seat base or support member 171 by means of a bracket 172 as shown in FIG. 5. It is to be understood that a plurality of switches 111 can be installed in each seat in a manner similar to that of the switches 111 shown in FIG. 2. Switch arm 170 is biased by means of a spring within switch 111 in a manner maintaining the switch contacts in an open position. The amount of movement of switch arm 170 required to close the switch contacts can be adjusted by means of a screw or bolt 174 threadably connected in a bracket 175 extending from the housing of switch 111 and positioned in a manner such that screw 174 engages switch arm 170. Switch arm 170 is connected by means of a flexible connector or wire 178 as shown in FIG. 5 to one end of a screw threadably connected to the surface of seat 84. The head of screw 180 is tightened against a washer-like member 182 on the outer surface of seat 84. A washer 183 and nut 184 are connected on screw 180 to hold the same in seat 84.

When a passenger is not on seat 84 and hence there is no pressure or force acting on the surface of the seat, screw 180 and the suitable connector or wire 178 pull up on or otherwise hold switch arm 170 in a position holding the contacts of switch 111 in an open position. When a passenger sits on the seat and force or pressure is exerted on the surface thereof, the corresponding movement of screw 180 and release of tension in connector 178 allows the bias spring of switch 111 to force switch arm 170 into a position closing in contacts thereof.

In the preferred form of the present invention relay 16 as shown in FIG. 1 normally is in a first state wherein relay 16 completes an operating circuit for the prime mover of the vehicle, that is relay switch arm 19 normally engages contact 23 completing a circuit including vehicle ignition coil 25 and vehicle storage battery 27. Then, when the condition responsive switching means operates in response to abnormal conditions of the vehicle, meter or monitoring system thereby to operate relay 16 to place the relay in a second state, switch arm 19 is moved from contact 23 into engagement with contact 35 thereby disconnecting coil 25 from the vehicle battery 29 and thus breaking or opening the vehicle operating circuit. Various alternative connections of relay 16 can be made, however, wherein relay 16 moves from a normal position, i.e. first state, to a fault-indicating position, i.e. second state, in response to operations of the condition responsive switching means which, in turn, operates in response to abnormal conditions of the vehicle meter or monitoring system. For example, movement of relay 16 to a fault indicating position can include movement of switch arm 19 into engagement with contact 35 which, in turn, can be connected to a suitable indicator. Thus, vehicle storage battery 29 would be connected through switch arm 19 into contact 35 to the indicator thereby signaling the occurrence of tampering or other unauthorized activity. The indicator can take various forms, for example a telemetering arrangement which can transmit a signal from the vehicle back to a central station, or movement of the switch arm 19 into engagement with contact 35 can activate the vehicle turn signals, brake lights, horn or high-beam lights. Then, if one of these conditions exist when the vehicle is returned, the taxi company supervisor will know if tampering or other unauthorized activity has taken place.

The monitoring system of this embodiment of the present invention operates in the following manner. In the absence of tampering or other unauthorized activity, relay 16 is in a quiescent or normal state as shown in FIG. 1 with switch arm 19 engageing contact 23 and with switch arm 20 engaging contact 37. According to a preferred mode of the present invention, when switch arm 19 engages contacts 23 a circuit is completed including vehicle storage battery 29 and ignition coil 25 thereby allowing normal operation of the vehicle. When any tampering or unauthorized activity of the type which will operate the condition responsive switching means occurs, a circuit is completed between lines 30 and 32 thereby energizing relay coil 17. In particular, terminal 13 of battery 12 is connected by a line 22 to one terminal of relay coil 17, the other terminal of which is connected through line 30, the condition responsive switching means, line 3, switch arm 20 and line 34 to terminal 14 of battery 12. Energization of relay coil 17 then moves switch arm 19 away from contact 23 thereby breaking the vehicle operating circuit in the present example. In addition, switch arm 20 is moved away from contact 37 into engagement with contact 39. This disconnects the condition responsive switching means from battery 12 thereby minimizing the current drain from the battery 12. This advantageously results in a significantly long lifetime of battery 12 in the monitoring system and therefore avoids need for any frequent replacement thereof.

After tampering or unauthorized activity has occured, relay 16 remains in position with switch arm 19 engaging contact 35 and switch arm 20 engaging contact 39. This position is maintained even if the vehicle operator is successful in restarting the vehicle such as by jumping the ignition coil 25. Then, when the vehicle is returned to a central station, an inspector or supervisor simply can depress test switch button 47 on housing 80 and if the foregoing sequence of events has occured, lamp 45 will be energized thereby indicating the same. In particular, movement of switch button 47 to engage contacts 48, 49 completes a circuit from battery terminal 14 through line 51, lamp 45, switch contacts 48, 49, line 53 switch arm 20, contact 39 and line 22 to battery terminal 13. Thus, the system of the present invention not only provides an immediate indication of or response to tampering or unauthorized activity, but permits an inspection of the system at a later time to determine if the foregoing has occurred. Relay 16 ultimately is returned to its initial condition or state by unlocking door 82 of housing 80 so that one can manually operate switch button 55 thereby completing a circuit from battery 12 to relay coil 16 to move switch arms 19 and 20 back into engagement with contacts 23 and 37, respectively.

The condition responsive switching means of the present invention detects tampering with the vehicle, meter and monitoring system. In particular, any attempt to move seats 84, 86 from the floor of the vehicle such as in tampering with switches 111 or 111', causes closing of switches 81 or 83 thereby connecting lines 30 and 32. Tampering with cable 67 to fare recording meter 65 by removing the cover of receptacle 71 will close switch 69 thereby connecting lines 30 and 32. Similarly, attempted tampering with receptacles 115 or 125 in a similar manner will cause closure of switches 119 or 129, respectively, to connect lines 30 and 32.

The condition responsive switching means of the present invention also prevents the vehicle operator from transporting passengers without operating the fare recording meter 65. In particular, once a passenger is on the front or rear passenger seats of the vehicle his weight on the surface of the seat will close one or a number of switches 111 or 111'. The switches are provided with the adjustment means of the present invention whereby even the slightest force or pressure can cause them to close. Once any of the switches 111 or 111' is closed, a circuit is completed from the vehicle storage battery 29 through the normally closed switches 103, 105 to coil 91 or relay 90. Unless the vehicle operator does one of two things within the predetermined time delay or relay 90, switch arm 92 will move into engagement with contact 93 thereby connecting lines 30 and 32. The operator can either move the meter flag 127 into a fare recording position which will then cause the position responsive switch 107 to open, or be can move gear shift lever 117 into a non-motion gear position thereby opening position responsive switch 103.

Housing 80 can be positioned in a convenient location in the vehicle, and cables connect the housing 80 with other parts of the system. Vehicle and the meter 65 as shown in FIG. 2. Any attempt to cut the various cables of the vehicle monitoring system will cause breaking or severing of line 165 thereby deenergizing coil 56 of relay 155 causing arm 157 to engage contact 159 to connect lines 30 and 32. This will happen also if the storage battery 29 is disconnected from the vehicle.

Figure 6:
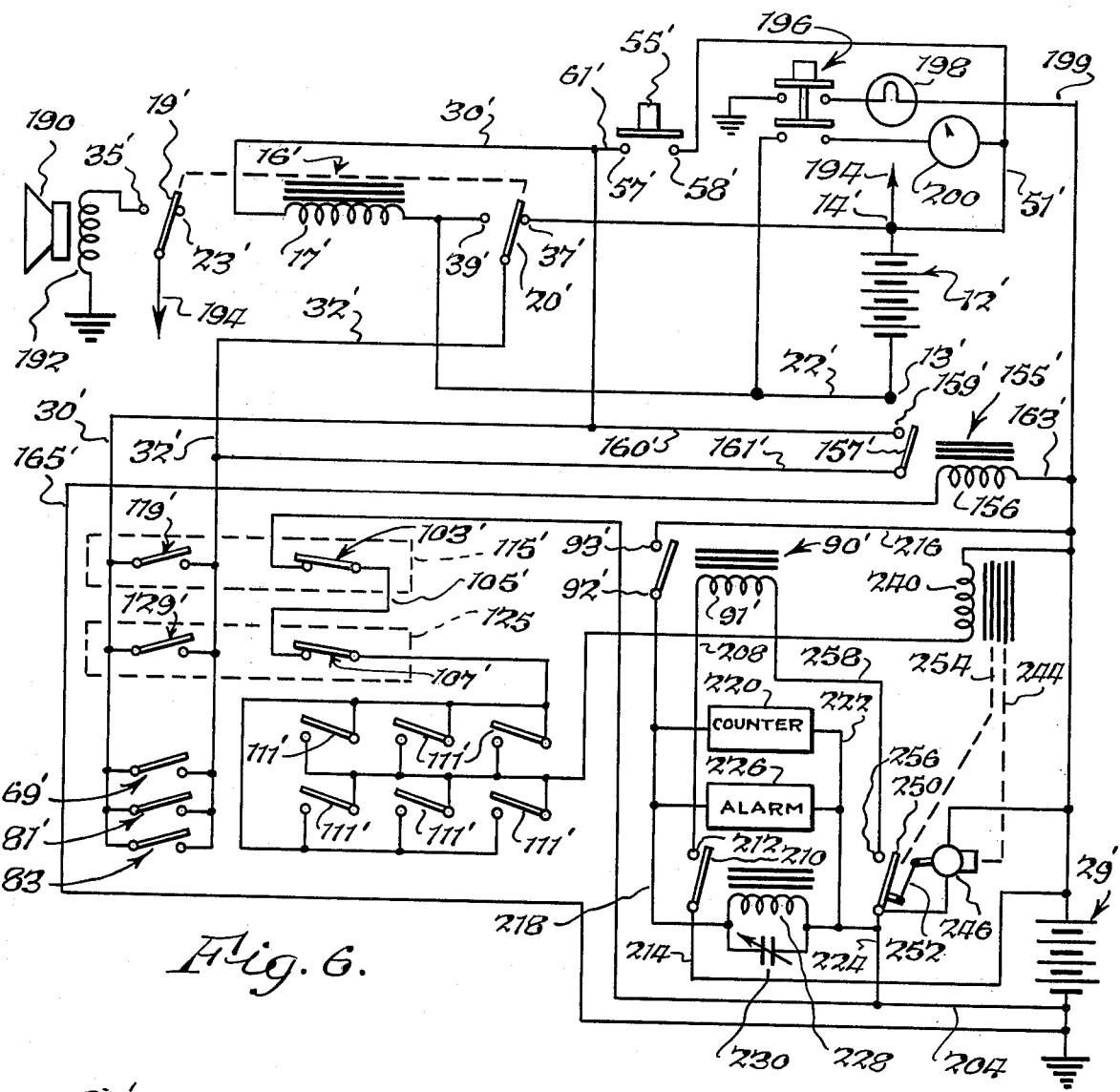
FIG. 6 is a schematic circuit diagram of a vehicle monitoring system according to another embodiment of the present invention.

FIG. 6 illustrates a vehicle monitoring system according to another embodiment of the present invention. Components in the circuit of FIG. 6 which are identical to corresponding components in the circuit of FIG. 1 are identified by the same reference numerals and are provided with a prime susperscript. In this embodiment of the present invention the vehicle operating circuit is not operatively connected to the electrically controlled switching means or relay 16', but rather when switch arm 19' is moved from a normal position, i.e. first state, engaging switch contacts 23' to a fault-indicating position, i.e. second state, engaging contact 35', an alarm or other suitable indicator is operated. In particular, there is provided alarm means in the form of a speaker 190 operatively associated with an energizing coil 192, one terminal of which coil is connected to switch contact 35'. Switch arm 19' is connected by a line 194 to the positive terminal of the terminal battery 12' located within the apparatus housing. Thus, upon closure of any one of the normally open switches 69', 81', 83', 119', or 129', which switches serve identical functions as the corresponding switches in the embodiment of FIG. 1, a circuit is completed energizing coil 17' or relay 16' in a manner similar to the operation of circuit of FIG. 1. This moves switch arm 19' into engagement with contact 35' thereby operating the alarm means to give an audible indication of a fault.

The audible alarm means comprising speaker 190 and coil 192 preferably comprises a low current consuming sounding device which will operate continously when tampering or other unauthorized activity is detected as previously described. The device preferably is installed in housing 80 in a manner preventing destructive tampering therewith and preferably will operate continuously once activated. Furthermore, the device should provide a penetrating noise loud enough to be heard over the vehicle radio when the driver answers or calls in. By having the alarm device connected to the internal battery 12' contained within housing 80, full time tamper protection is provided even if the vehicle storage battery 29' happens to be disconnected.

With the alarm device providing an immediate and continual indication once tampering occurs, the test switch in the circuit of FIG. 1 can be replaced, if desired, with a double pole monetary contact switch means 196. When the button of switch 196 is depressed, a first pair of contacts are bridged or otherwise engaged to complete a circuit from electrical ground through a lamp 198 and a line 199 to the positive terminal of vehicle storage battery 29'. Lamp 198 can be used to illuminate selected portions of the apparatus for inspection thereof as will be explained further on in the specification. Simultaneously a second pair of switch contacts will be bridged or engaged to complete a circuit from the positive terminal of internal battery 12' through a meter or other indicator 200 to the negative terminal of battery 12' thereby providing a means for testing the condition of battery 12'.

The monitoring system according to this embodiment of the present invention detects the presence of a passenger in the vehicle, and if an attempt is made to transport the passenger without operating the fare recording meter within a predetermined time, a permanent record of each attempt is made, such as by triggering a counter. Referring now to FIG. 6, a series combination of the position responsive, operator-controlled switches 103" and 107' and the passenger detecting switches 111' is provided as in the system of FIG. 1. Switch 103' is connected by a line 204 to the negative terminal of vehicle storage battery 29'. The series combination of switches 111' is connected by a line 206 to control means including a time delay relay 90' similar to relay 90 in the circuit on FIG. 1. In particular one terminal of a control coil 91' of relay 90' is connected through a line 208, a normally closed switch arm 210 engaging a contact 212, and a line 214 to the positive terminal battery 29. The other terminal of control coil 91' is connected through a circuit portion which will be described in detail presently, to the negative terminal of battery 29' and this circuit portion is operatively connected to line 206.

When the control coil 91' is energized, it causes movement of relay switch arm 92 from the normally open position shown in FIG. 6 into engagement with a contact 93'. Switch contact 93 is connected by a line 216 and by line 199 to the positive terminal of storage battery 29'. Switch arm 92' is connected by a line 218 to one terminal of a recording means in the form of a digital counter 220 which provides a record of each time a discrete input signal is applied thereof. The other terminal of counter 220 is connected by a line 222 and by a line 224 to line 204 and hence to the negative terminal of battery 29'. Counter 220 registers each time an input signal is applied thereto, i.e. each time switch arm 92' is closed to engage contact 93', and provides a total or cumulative count of the number of times this occurs. The count is readily determined through a viewing window provided in housing 80 wherein counter 220 is located. A preferred form of counter 220 is available commercially under the designation Veeder Root model RM 0711. A suitable alarm device 226 such as buzzer or bell, is connected across counter 220 to provide an audible alarm signal each time there is a digit change in counter 220. Also connected across counter 220 is the control coil 228 of a relay for operating switch arm 210. A variable capacitor 230 is connected across coil 228 for regulating the time delay of the relay.

The system of FIG. 6 preferably also includes holding or stabilizing circuit means operatively connected to the passenger detecting switching means 111' and to the control means including time delay relay 90' for insuring that the control means is maintained in proper operation when a passenger sits on the vehicle seat. In preferred form the holding circuit comprises a solenoid 240, one terminal of which is connected to line 206 and thus to the passenger detecting means 111'. The other terminal of solenoid 240, is connected through the lines 199 to battery 29. Solenoid 240 is operatively connected as represented by the broken line 244 to a timer motor 246. Timer motor 246, in turn, is connected across battery 29. Motor 246 is operatively connected to a switch arm 250 as indicated by the connection represented by the dashed line 252. Switch arm 252 also is operatively connected to solenoid 240 as indicated by broken line 254. Switch arm 252 is connected electrically to line 224 which is connected through line 204 to the negative terminal of battery 29'. Switch arm 252 normally is in the position shown in FIG. 6, but in response to energization of solenoid 240 it moves into a position engaging a switch contact 256 which is connected by a line 258 to the control coil 91' of relay 90'. The combination of solenoid 240, motor 246, and switch 252, 256 is commercially available under the commercial designation A.M.F. Paragon 500 series type 502 delay timer.

The system of FIG. 6 operates in the following manner. Once any one of the switches 111' is closed, a circuit is completed from the negative terminal of battery 29' through line 204, through normally closed switches 103' and 107' and the closed switch 111', and through line 206, solenoid 240 and line 199 to the positive terminal of battery 29'. Solenoid 240 is energized which closes switch arm 252 into engagement with contact 256. As a result, the negative terminal of battery 29' is connected by line 224, switch arm 252 engaging contact 256, and line 258 to one terminal of coil 91'. The other terminal of coil 91' is connected by line 208, the normally closed switch arm 210 engaging contact 212, and line 214 to the positive terminal of battery 29'. As a result, relay control coil 91' is energized. Unless the vehicle operator does one of two things within the predetermined time delay of relay 90', switch arm 92' will move into engagement with contact 93' thereby completing a circuit to counter 220 thereby registering a count. The time delay of relay 90' preferably is in the range of from about 10 seconds to about 30 seconds. This circuit path is from the positive terminal of battery 29' through lines 199 and 216, switch arm 92' engaging contact 93', line 218, counter 220, lines 222 and 224 and through line 204 to the negative terminal of battery 29'. As in the embodiment of FIG. 1, the operator can prevent the counter 220 from registering a count indicative of a fault by either moving the meter flag 127 into a fare recording position which will then cause the position responsive switch 107' to open, or he can move gear shift lever 117 into a non-motion gear position thereby opening the position responsive switch 103'. Thus time delay relay 90' and the operator-controlled switches 103 and 107 comprise a control means connected to the passenger detecting means in the form of switches 111' and to counter 220, the switches 103 and 107 having a plurality of states, i.e. open or closed. The control means is operative to complete a circuit or apply a signal to the input of counter 220 a predetermined time after a passenger is in the vehicle unless the operator controlled switching means is in a particular one of the states, i.e. either switch 103 or 107 is opened.

The relay comprising control coil 228 and switch arm 210 comprises a current sensitive or other suitable delay relay that will open switch arm 210 out of engagement with contact 212 at a speed slower than the speed of operation of counter 220. This is to insure positive digit locking of counter 220. In addition, once the digit locking of counter 220 occurs, the opening of switch arm 210 breaks the circuit to control coil 91' of time delay relay 90' thereby causing relay 90' to reset for another predetermined period. This sequence will continue until the vehicle operator implements his various options as described above. Each time counter 220 is tripped or operated, alarm 226 operates to alert the vehicle operator to every digit change of counter 220. Counter 220 is located within the locked housing 80, inaccessible to the vehicle operator, and can be viewed readily by supervisory personnel either through a window provided in the housing or by unlocking the housing when the vehicle is returned to the garage.

The holding or stabilizing circuit means operates in the following manner. Once any of the switches 111' is closed, solenoid 240 is energized whereupon switch arm 250 is moved into engagement with contact 256 thereby causing control coil 91' to be energized as described above. If coil 91' remains energized for the preset time delay, i.e. between about 10 and about 30 seconds, switch arm 92' will be moved into engagement with contact 93' as described above. The holding circuit means insures that closing of switch arm 92' will be prevented only by opening of either switch 103' or 107' which is the normal and desired mode of operation of the system. In other words, if for any reason the switch 111' which has been initially closed is opened before the end of the predetermined time of operation of relay 90', this will not interfere with the normal operation of the system. In particular, opening of any one of the initially closed switches 111' will de-energize solenoid 240, and de-energizing of solenoid 240 starts operation of timer motor 246 through operative connection 244. After a predetermined time delay, preferably about 2–5 seconds, motor 246 opens switch arm 250 thereby de-energizing control coil 91'. Thus, the initially-closed switch 111' would have to remain open for a time longer than the preset time delay of motor 246 in order to de-energize coil 91', and this prevents interference with normal operation of the system by a relatively quick opening and closing of passenger detecting switches 111'. The provision of the holding circuit means thus prevents the system from erratic resetting. This could happen if a passenger bounces on the seat or if the operator should be able to agitate or shake the fare registering meter arm in an attempt not to register a count or indication in the system.

Figure 7:
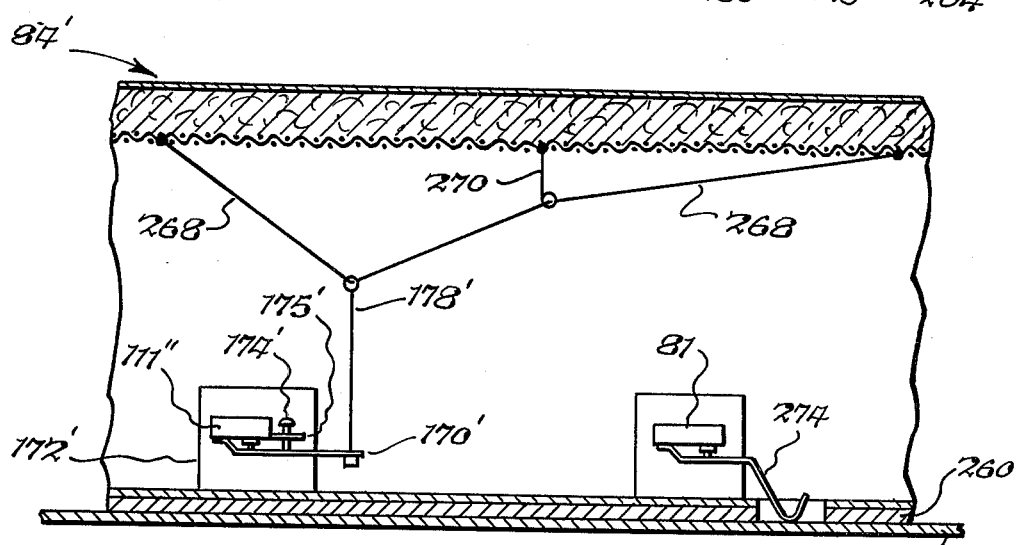
FIG. 7 is a fragmentary elevational view, partly in section, of an alternative passenger detecting means for use in the monitoring system of the present invention.

FIGS. 7 shows an alternative passenger detecting means which can be used in the monitoring system of the present invention. A normally open switching means 111' identical to micro switch 111' shown in FIG. 5 is mounted by a bracket 172' to the bottom of seat 84'. The seat bottom rests on a carpet 260 which overlays the vehicle floor 262 as seen in FIG. 7. The movement of switch arm 170' required to close the switch contacts is adjustable by a screw 174' threaded in a bracket 175' in a manner similar to the arrangement of FIG. 5.

The passenger detecting means according to this embodiment of the present invention advantageously detects the presence of a passenger at a plurality of locations, in this example three, on seat 84'. A first flexible connector member in the form of wire 178' is connected at one end to switch arm 170. The other end of connector 178' is connected to a second flexible connector in the form of a flexible line 268 such as high tension fishing line or the equivalent. In particular, wire 178' is connected to a point intermediate the ends of line 268, and each end of line 268 is connected to a point on the seating surface of seat 84'. Line 268 is connected by a flexible wire line 270 to a third point on the surface of seat 84' which line 270 is connected to line 268 at a point between one end of line 268 and the connection of wire 178' to line 268. FIG. 7 also illustrates the mounting of one of the switches 81 also is in the form of a micro switch, is mounted to the bottom of seat 84' and has an extended switch arm 274 which engages vehicle floor 262.

The arrangement of FIG. 7 is installed such that wires 178', 268 and 270 are drawn tight or in tension so as to be taut and thereby to pull up on or otherwise hold switch arm 170' in a position holding the contacts of switch 111' in an open position. When a passenger sits on the seat and force or pressure is exerted on the surface thereof, the tension in the portion of line 268 nearest the point of application of force to seat 84 is released thereby releasing tension in wire 178' allowing the bias spring of switch 111' to force switch arm 170' into a position closing the contacts thereof. The combination of flexible connector 178', flexible line 268 and wire 270 provides flexible connecting means enabling switch 111' to detect the presence of a passenger at a number of locations on seat 84'. Switch 111' detects any slack in the flexible connecting means. This advantageously is accomplished with a single switch and by an arrangement which is effective and economical yet not hazardous to the vehicle occupants.

Figure 8:
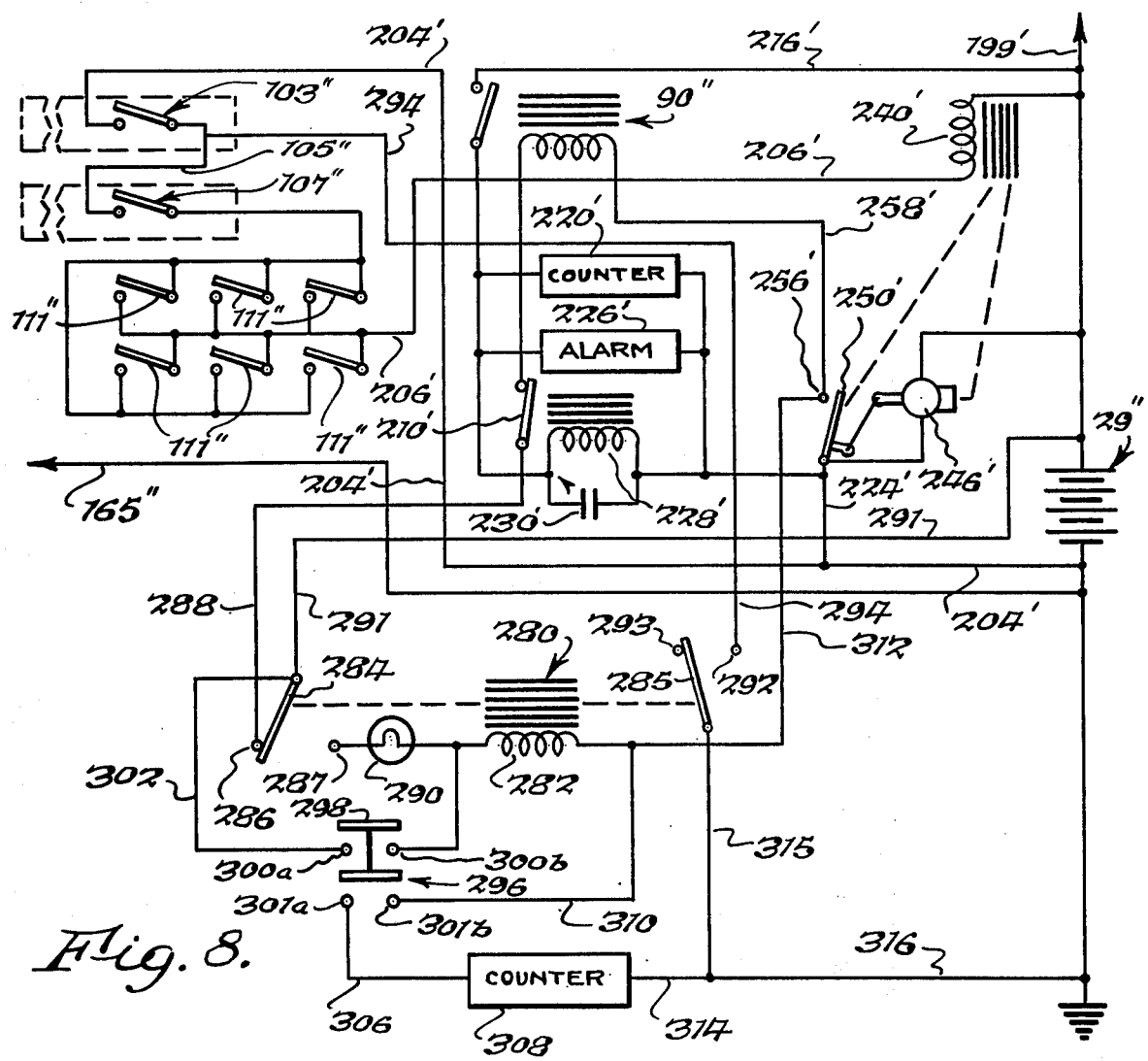
FIG. 8 is a schematic circuit diagram of a vehicle monitoring system according to another embodiment of the present invention.

FIG. 8 illustrates a vehicle monitoring system according to another embodiment of the present invention. This embodiment is similar to the system of FIG. 6 but is modified to include a mode of operation allowing for flat rate fares. Components in the circuit of FIG. 8 which are identical to corresponding components in the circuit of FIG. 6 are identified by the same reference numerals and are provided with the appropriate prime or double prime superscript. For convenience in illustration, however, only a few of those components are shown in FIG. 8, it being understood that the remaining components not specifically shown nevertheless are included in the complete system. Referring now to FIG. 8, a series combination of the position responsive, operator-controlled switches 103" and 107" and the passenger detecting switches 111" is provided as in the system of FIG. 6. Switch 103" is connected by a line 204' to the negative terminal of vehicle storage battery 29", and the series combination of switches 111" is connected by a line 206' to control means including time delay relay 90" as in the system of FIG. 6. Counter 220', alarm 226' and the parallel combination of inductor 228' and variable capacitor 230' are included, along with solenoid 240', timer motor 246' and switch arm 250', all in a manner similar to that of the system of FIG. 6.

In accordance with this embodiment of the present invention there is provided a relay 280 including a control coil 282 and a pair of switch arms 284, 285 controlled thereby. Switch arm 284 is movable between a pair of contacts 286, 287. Contact 286 is connected by a line 288 to switch arm 210', and contact 287 is connected through an electrical indicator in the form of lamp 290 to one terminal of relay control coil 282. Switch arm 284 is connected through a line 291 to the positive terminal of battery 29". Switch arm 285 is movable between a pair of contacts 292 and 293, with contact 293 not being connected electrically in the circuit. Contact 292 is connected by a line 294 to line 105" which connects switches 103" and 107" in series.

The circuit of FIG. 8 also includes a double pole switch means 296 including a switch operator or button 298 and first and second pairs of contacts 300a, 300b and 301a, 301b, respectively. Contact 300a is connected by a line 302 to switch arm 284 and therefore through line 291 to the positive terminal of battery 29". Contact 300b is connected by a line 304 to the junction of lamp 290 and coil 282. Contact 301a of switch means 296 is connected by a line 306 to the input of a counter 308 for indicating the number of times the system is operated in a flat rate mode. Contact 301b of switch means 296 is connected by a line 310 to the end of relay coil 282 opposite the end connected to line 304. Line 310 also is connected through a line 312 to switch contact 256' and therefore to line 258'. Counter 308 and switch arm 293 are connected by lines 314 and 315, respectively, to a line 316 connected to the negative terminal of battery 29" and to an electrical ground or reference.

The system of FIG. 8 operates in the following manner. When a passenger sits in the vehicle, one or more of the switches 111" close and with the taximeter in the off position, i.e. with the meter flag in the non-recording position, switch 107' is closed. To place the system in the flat rate mode of operation, the driver presses the button or operator 298 of switch means 296 thereby connecting or closing switch contacts 300a, 300b and 301a, 301b. This completes an energizing circuit for relay coil 282 from the positive terminal of battery 29" through lines 291 and 302 and switch contacts 300a, 300b to one terminal of coil 282, and from the other terminal thereof through line 310, switch contacts 301a and 301b, line 306, counter 308 and lines 314 and 316 to the negative terminal of battery 29". Thus, each time an energizing circuit is completed for relay coil 282, a count of one digit is registered in counter 308.

Energization of relay coil 282 moves switch arm 284, 285 from the positions shown in FIG. 8 to positions where arm 284 engages contact 287 and arm 285 engages contact 292. With switch arm 285 engaging contact 292, an energizing circuit for solenoid 240' is completed from the positive terminal of battery 29" through solenoid 240', line 206', switches 111" and 107", line 294, switch arm 285 engaging contact 292, and lines 315, 316 to the negative terminal of battery 29". Energization of solenoid 240' resets timer motor 246' for closing arm 250' into engagement with contact 256' as in the system of FIG. 6, and the role of this operation in the flat rate mode will be explained presently.

With switch arm 284 engaging contact 287, line 288 is disconnected from line 291 and the circuit for coil 90" is opened. As a result, operation of counter 220 is prevented or circumvented. In particular, a holding circuit is completed from the positive terminal of battery 29" through line 291, switch arm 284 engaging contact 287, lamp 290, to one terminal of coil 282, and from the other terminal thereof through line 312, contact 256', arm 250' and lines 224' and 204' to the negative terminal of battery 29". The switch operator or button 298 can be released and the holding circuit is maintained until the passenger leaves the vehicle thereby opening switch 111" or until the meter is placed in a fare recording mode thereby opening switch 107". Either of these events de-energizes solenoid 240' thereby beginning operation of timer motor 246' which after the predetermined time delay such as 2–5 seconds opens switch arm 250' from contact 256' as in the system of FIG. 6. This, in turn, opens or breaks the holding circuit for relay coil 282 thereby de-energizing coil 282 and causing switch arm 284, 285 to return to the initial positions.

Thus, switch 296 comprises selector means for initialing flat rate fare operation and the circuit incuding relay 280 and switch arms 284, 285 and the branches they control comprise circuit means for circumventing or shunting the operation of the recording means or counter 220' when switch 296 is operated.

The system of FIG. 8 provides a record in the form of the visible count indicated by counter 308 of the number of times the taximeter is placed in the flat rate mode. In other words, inspection of counter 308 provides an immediate indication of the number of flat rate fares made in a given period of time. The system of FIG. 8 requires a passenger in the vehicle and on the seat so as to close one of the switches 111" before the flat rate mode of operation can be started. The portion of the system enabling flat rate fare operation shuts off automatically once the passenger leaves the vehicle or the meter is placed in the fare recording mode of operation. During the flat rate mode of operation, a visible indication that the system is in this mode is provided by lamp 290. The holding circuit in the system of FIG. 8 advantageously utilizes the 2–5 second delay circuit of seat switches 111" or meter position switch 107" so that a passenger bouncing on the seat will not break the holding circuit thereby making the system highly stable.

While the system of the present invention has been illustrated with electromechanical components such as relays, solenoids and timer motors, it can be constructed readily with electronic components. As shown in FIG. 9, an electronic version can include a signal generator 320 operatively connected to seat switches 111", meter switch 107" and gear switch 103". Closing of all of these switches in a manner similar to that of other embodiments causes signal generator 320 to provide an output signal which is applied simultaneously through line 322 to one input of a gate circuit 324 and through line 326 to the input of a timer 328. The output of timer 328 is connected by a line 330 to the other input of gate 324.

Timer 328 operates to produce an output signal a predetermined time after an input is applied thereto, and this pre-set time is the grace period allowed the vehicle operator to start the fare recording meter for example 15 seconds, as in the other embodiments. If the meter is started thereby opening switch 107" within this time interval, generator 320 no longer produces an output signal and no signal is transmitted through gate 324. Of course, the same could occur if the passenger left the vehicle thereby opening switch 111" or if the vehicle were placed in a non-motion gear thereby opening switch 103". If the meter is not placed in operation within this time period, however, the two signals on lines 322 and 330 are applied simultaneously to gate 324 which, in turn, passes a signal through a line 332 to the input of a second timer circuit 334. Circuit 334 produces an output pulse train of constant frequency so long as an input signal is applied thereto. The output frequency of circuit 334 can be adjusted by suitable means designated 336 operatively connected thereto, and a typical operating frequency is one pulse every 30 seconds. The output of circuit 334 is connected by a line 338 to the input of a driver or amplifier circuit 340 which, in turn, is connected by a line 342 to the input of a counter 344, which serves the same purpose as counter 220 in the system of FIG. 6. Circuit 340 produces a pulse of sufficient amplitude and width to register one count or counter 344, the pulse width being adjustable by suitable means designated 346 operatively connected thereto. These counts continue until the fare recording meter is placed in operation, the passenger leaves the vehicle, or the vehicle is placed in a non-motion gear, i.e. park, neutral or reverse. The number recorded on the counter 344 after a given period, such as at the end of a business day, enables the amount of lost time and money to be calculated.

The arrangement of FIG. 9 also includes a flat rate accessory as in the system of FIG. 8. As previously described, the system cannot be transferred to the flat rate mode of operation until a passenger sits in the vehicle closing one of the switches 111". When the driver depresses the flat rate switch 296', a holding circuit 350 is activated to produce an output command signal on line 352 to lock in the control. The signal on line 352 is applied to the input of a driver or amplifier circuit 354. Line 352 also is connected through a line 356 to the input of an inhibit circuit 358, the output of which is connected by a line 360 to timer 328. The application to timer 334 of a signal of appropriate magnitude and/or polarity as provided by inhibit circuit 358 prevents operation of timer 334 in a manner readily apparent to those skilled in the art. This prevents counting of counter 344 which could be mistaken as a no charge fare. The presence of a command signal on line 352 also causes lighting of a flat rate indicator lamp 362 operatively connected thereto.

The driver or amplifier circuit 354 produces a pulse of sufficient amplitude and width to register one count on a counter 364, the output of circuit 354 being connected through a line 366 to the input of counter 364. The number on this counter 364 is checked at the end of each shift and should correspond to the number of flat rate fares on the driver's log. When the passenger leaves the vehicle, the flat rate circuit is automatically reset by the seat switch, and the system returns to a normal mode of operation. Placing the fare recording meter in the "on" condition will also reset the flat rate circuit by means of line 368 connecting meter switch 107″ to holding circuit 350.

The arrangement of FIG. 9 also includes a tamper detection portion as in the other embodiments. The system of FIG. 9 includes an audible alarm device 190′ like that of the system of FIG. 6 which, when triggered, will sound constantly with an intensity of around 70 decibels. Once a tamper has occurred, the alarm 190′ will continue, according to this arrangement, even if the tamper condition is corrected, until it is reset by authorized personnel with a key.

Numerous conditions can be protected as in the other embodiments such as lifting of the seats in an attempt to disable the seat switches, severing of any cables, probing of any cables with a pin or sharp object in an attempt to short them out, and disconnecting the unit from the taxi battery. Switches for detecting these conditions are provided in a manner similar to that of the other embodiments, and box 372 in the arrangement of FIG. 9 collectively represents these switches. A tamper signal generator 374 is provided, being connected to each of the switches through a plurality of lines collectively represented 376. When any of the tamper conditions occurs, the particular detector switch activates generator 374 which, in turn, sends a pulse along line 378 to the input of a tamper hold circuit 380 which, in turn, maintains an output signal until reset by switch 382 operatively connected thereto. The output of component 380 is applied through line 384 to an alarm rate control circuit 386 which, in turn, is connected through a line 388 to the input of an alarm amplifier or driver circuit 400. Circuit 400 is connected through a line 402 to alarm 190′. Adjustment of alarm rate circuit 386 by suitable means designated 404 operatively connected thereto controls the off time of alarm 190′ in a known manner.

In the systems of FIGS. 1, 6 and 8 opening and closing of switch 107 occurs in response to manual movement of the meter flag 127 or other control into fare recording or off conditions, respectively. FIG. 10 illustrates an alternative arrangement wherein flow of electrical current in response to operation of the meter is utilized to open a switch similar to switch 107. In particular, manually operated switch 107 is replaced by switch arm 410 of a relay 412 having a control coil 414. Relay 412 would be located within the locked housing of the apparatus. One terminal of coil 414 is connected by line 416 to the negative terminal of battery 29, and the other terminal is connected through a line 418 to a line 420 of the electrical power circuit for energizing a dome meter indicator lamp 422 when the meter is on, i.e. in a fare recording condition. Thus, when the meter is on, current flows through line 420 to energize lamp 422, and a portion of this current will flow through line 418 thereby energizing relay coil 414 and causing switch arm 410 to open. Tamper detection line 165′ is shown leading along the cable containing line 418, being wound or wrapped around line 420 and returning along the cable of line 418 to complete the circuit. This prevents removal of the cable containing line 418 from connection to line 420 without detection.

Figure 11:
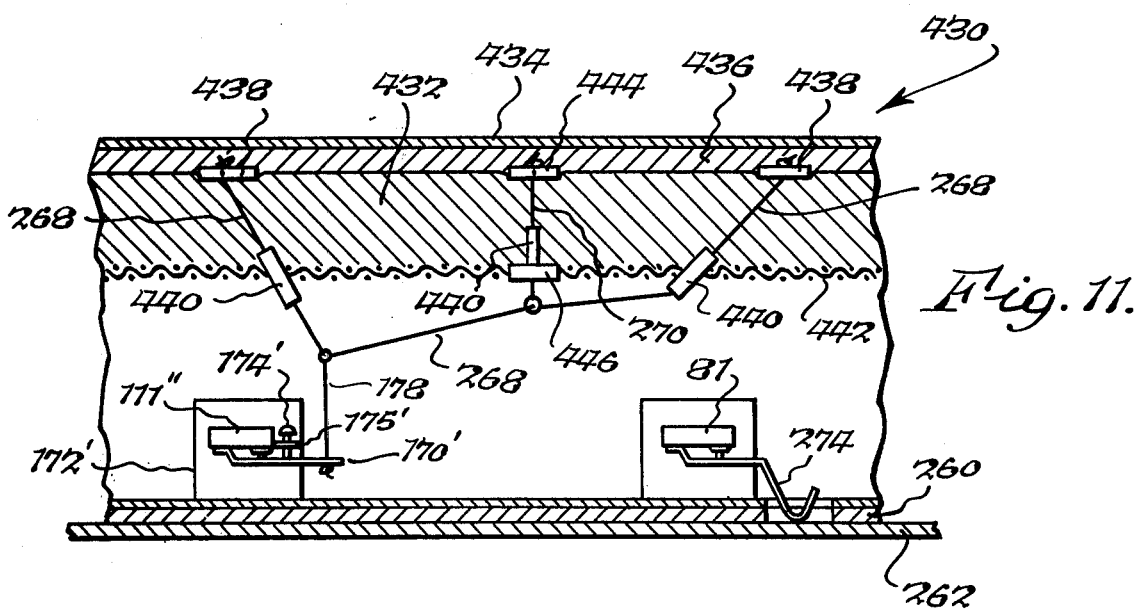
FIG. 11 is a fragmentary elevational view, partly in section, of an alternative passenger detecting means for use in the monitoring system of the present invention.

FIG. 11 shows an arrangement of passenger detecting means similar to that of FIG. 7 but adapted for use with solid foam rubber seats. Like elements in FIGS. 11 and 7 are given identical numerals to simplify the illustration. The passenger seat, generally designated 430, includes a foam rubber filling 432 and a vinyl cover 434 spaced therefrom by a small air space 436. A plurality of sensors 438 each in the form of small metal discs are located on the top surface of the seat material 432. Flexible line or connecter 268 is connected at each end to corresponding sensors 438 at spaced locations, each end of line 268 having an enlargment or knot securring it in a small aperture provided in the disc. Sleeves or bushings 440 are attached to the springwork 442 and in seat material 432 for the purpose of protecting line 268. Line 268 extends through both bushings 440. The arrangement of FIG. 11 is a three point sensor and to this end another flexible line 270 is connected to line 268 in a manner similar to the arrangement of FIG. 7. Line 270 is connected at one end to a sensor 444 which is in the form of a disc but preferably of slightly larger diameter as compared to sensors 438. A bushing 440 and washer 446 are provided adjacent springwork 442 for receiving and protecting line 270, and the other end of line 270 is connected to line 268.

The arrangement of FIG. 11 operates in the following manner. Lines 178 and 268 describe or define a Y configuration, with line 270 defining another branch thereof. The arrangement is installed so that lines 178, 268, and 270 are drawn tight or in tension as in the arrangement of FIG. 7. When a passenger sits on the seat and force or pressure is exerted on the surface thereof, the tension in the portion of the arrangement of lines is released thereby distorting the Y. This, in turn, operates switch arm 170 in the manner previously described.

It is therefore apparent that the present invention accomplishes its intended objects. While several embodiments of the present invention have been described in detail, this is for the purpose of illustration, not limitation.

I claim:
1. A monitoring system for a vehicle for hire having a meter for registering the fare, said vehicle having an operating circuit including a storage battery, said monitoring system comprising:
   a. a source of direct current having a pair of terminals;
   b. electrically controlled switching means connected to one terminal of said source, said switching means normally having a first state and operative to change to a second state when an electrical circuit is completed between said source and said switching means;

c. condition responsive switching means connected to the other terminal of said source and to said electrically controlled switching means, said condition responsive switching means being operative in response to abnormal conditions of said meter, said vehicle and said monitoring system to complete an electrical circuit between said source and said electrically controlled switching means;

d. said electrically controlled switching means including means connected to said source and said condition responsive switching means for disconnecting said condition responsive switching means from said other terminal of said source when said electrically controlled switching means is operated to minimize current drain from said source; and e. a housing located in said vehicle and containing said source of direct current and said electrically controlled switching means of said monitoring system.

2. A monitoring system for a vehicle for hire having a meter for registering the fare, said monitoring system comprising:

a. a source of direct current having a pair of terminals;

b. electrically controlled switching means connected to one terminal of said source, said switching means normally having a first state and operative to change to a second state when an electrical circuit is completed between said source and said switching means;

c. condition responsive switching means connected to the other terminal of said source and to said electrically controlled switching means, said condition responsive switching means being operative in response to abnormal conditions of said meter, said vehicle and said monitoring system to complete an electrical circuit between said source and said electrically controlled switching means;

d. said electrically controlled switching means including means connected to said source and said condition responsive switching means for disconnecting said condition responsive switching means from said other terminal of said source when said electrically controlled switching means is operated to minimize current drain from said source; and e. a test circuit including electrically-operated indicating means and normally open test switch means, said circuit being connected to one terminal of said source and to said electrically controlled switching means whereby said electrically controlled switching means when operated completes a circuit including said source and said test circuit so that upon closing of said test switch means said indicating means is operated if said electrically controlled switching means has been operated by said condition responsive switching means in response to abnormal conditions of said meter, said vehicle and said monitoring system.

3. Apparatus according to claim 1, further comprising reset switch means connected to said other terminal of said source and to said electrically controlled switching means for completing an electrical circuit between said source and said switching means to return said switching means to its original state connecting said condition responsive switching means to said source.

4. Apparatus according to claim 1, wherein said condition responsive switching means comprises normally open mechanically operated switching means positioned so as to be closed in response to movement of components of said meter, said vehicle and said monitoring system during tampering therewith.

5. Apparatus according to claim 1, wherein said condition responsive switching means comprises:

a. electrically-controlled switching means including time delay means; and b. means for energizing said time delayed electrically-controlled switching means and including passenger detecting means and normally-closed operator controlled switching means;

c. whereby said time delayed switching means is operated a predetermined time after a passenger is in the vehicle unless said operator controlled switching means is opened.

6. Apparatus according to claim 5, wherein said passenger detecting means comprises normally open switching means mounted in the seats of said vehicle in a manner so as to be closed when a passenger sits on the vehicle seat, said switching means including sensitivity adjustment means for varying the degree of movement of said switching means required to close said switching means.

7. Apparatus according to claim 5, wherein said meter has manually operated actuating means and wherein said normally closed operator controlled switching means comprises position responsive switching means connected to said meter actuating means whereby said operator controlled switching means is opened when said meter actuating means is in a fare recording position.

8. A monitoring system for a vehicle for hire having a meter for registering the fare, said monitoring system comprising:

a. a source of direct current having a pair of terminals;

b. electrically controlled switching means connected to one terminal of said source, said switching means normally having a first state and operative to change to a second state when an electrical circuit is completed between said source and said switching means;

c. condition responsive switching means connected to the other terminal of said source and to said electrically controlled switching means, said condition responsive switching means being operative in response to abnormal conditions of said meter, said vehicle and said monitoring system to complete an electrical circuit between said source and said electrically controlled switching means, said condition responsive switching means comprising electrically controlled switching means including time delay means and means for energizing said time delayed electrically controlled switching means and including passenger detecting means and normally closed operator controlled switching means whereby said time delayed switching means is operated a predetermined time after a passenger is in the vehicle unless said operator controlled switching means is opened;

d. said vehicle including transmission gear selection means and said normally closed operator controlled switching means comprising position responsive switching means connected to said gear selection means whereby said operator controlled switching means is opened when said gear selection means is in position corresponding to a non-motion gear; and e. said electrically controlled switching means including means connected to said source and said condition responsive switching means for disconnecting said condition responsive switching means from said other terminal of said source when said electrically controlled switching means is operated to minimize current drain from said source.

9. A monitoring system for a vehicle for hire having a meter for registering the fare, said monitoring system comprising:
 a. a source of direct current having a pair of terminals;
 b. electrically controlled switching means connected to one terminal of said source, said switching means normally having a first state and operative to change to a second state when an electrical circuit is completed between said source and said switching mean;
 c. condition responsive switching means connected to the other terminal of said source and to said electrically controlled switching means, said condition responsive switching means being operative in response to abnormal conditions of said meter, said vehicle and said monitoring system to complete an electrical circuit between said source and said electrically controlled switching means;
 d. said electrically controlled switching means including means connected to said source and said condition responsive switching means for disconnecting said condition responsive switching means from said other terminal of said source when said electrically controlled switching means is operated to minimize current drain from said source; and
 e. a portion of said monitoring system being contained within a housing located in said vehicle and electrical cable means connecting the system portion within said housing to the remaining portion of said system in said vehicle and outside of said housing, said condition responsive switching means comprising normally open electrically controlled switching means, a source of direct current having a pair of terminals, and a line connecting said terminals to said switching means and located within said cable means, said line normally completing an energizing circuit for said electrically operated switching means, whereby severing of said cable means results in opening of the energizing circuit for said switching means thereby causing said switching means to close.

10. A monitoring system for a vehicle for hire having a meter for registering the fare, said monitoring system comprising:
 a. a source of direct current having a pair of terminals;
 b. electrically controlled switching means connected to one terminal of said source, said switching means normally having a first state and operative to change to a second state when an electrical circuit is completed between said source and said switching means;
 c. condition responsive switching means connected to the other terminal of said source and to said electrically controlled switching means, said condition responsive switching means being operative in response to abnormal conditions of said meter, said vehicle and said monitoring system to complete an electrical circuit between said source and said electrically controlled switching means;
 d. said electrically controlled switching means including means connected to said source and said condition responsive switching means for disconnecting said condition responsive switching means from said other terminal of said source when said electrically controlled switching means is operated to minimize current drain from said source; and
 e. said vehicle including an electric storage battery and said condition responsive switching means comprising normally open electrically controlled switching means connected to said battery whereby said switching means is closed in response to disconnection of said battery.

11. Apparatus according to claim 1, wherein said vehicle has an operating circuit for the prime mover of the vehicle and wherein said electrically controlled switching means is connected to said vehicle operating circuit in a manner such that said switching means normally completes said operating circuit when in said first state and said switching means opens said operating circuit when changed to said second state.

12. Apparatus according to claim 1, further including alarm means operatively connected to said electrically controlled switching means in a manner such that said alarm means is operated when said switching means is in said second state.

13. A monitoring system for a vehicle for hire having a meter for registering the fare, said monitoring system comprising:
 a. a source of direct current having a pair of terminals;
 b. a relay having a control coil and two switch arms operated thereby, one terminal of said control coil being connected to one terminal of said source and the other of said switch arms being in a normal position but movable to a fault-indicating position when said control coil is energized;
 c. condition responsive switching means operated in response to tampering and other unauthorized activity with said vehicle, the meter and the monitoring system and connected to the other terminal of said relay control coil and connected through the other switch arm of said relay to the other terminal of said source, said condition responsive switching means completing an electrical circuit between said source and said relay control coil when said switching means is mechanically operated; and
 d. whereby in response to energization of said relay control coil, said one switch arm is moved to disconnect said source from said condition responsive switching means to minimize current drain from said source and said other switch arm is moved to said fault-indicating position.

14. Apparatus according to claim 13 further including circuit means connected to said relay and having indicating means for providing an indication that said other switch arm is in said fault indicating position in response to said tampering and other unauthorized activity.

15. A monitoring system for a vehicle for hire having a meter for registering the fare, said monitoring system comprising:
 a. passenger detecting means for signalling the presence of a passenger in the vehicle;
 b. recording means having an input and operative to provide a record of each time a discrete input signal is applied thereto; and c. control means operatively connected to said passenger detecting means and to said input of said recording means, said control means including time delay means and operator-controlled switching means having a plurality of states, said control means being operative to apply a discrete signal to said input of said recording means a predetermined time after a passenger is in said vehicle unless said operator controlled switching means is in a particular one of said states.

16. Apparatus according to claim 15, wherein said recording means comprises a counter for registering each time an input signal is applied thereto and for providing a total count of the number of said input signals.

17. Apparatus according to claim 15, further including alarm means operatively connected to said recording means for providing an alarm each time an input signal is applied to said recording means.

18. Apparatus according to claim 15, wherein said meter has manually operated actuating means and wherein said operator-controlled switching means comprises position responsive switching means connected to said meter actuating means whereby said operator controlled switching means is in said particular state when said meter actuating means is in a fare recording position.

19. A monitoring system for a vehicle for hire having a meter for registering the fare, said monitoring system comprising:
  a. passenger detecting means for signalling the presence of a passenger in the vehicle;
  b. recording means having an input and operative to provide a record of each time a discrete input signal is applied thereto;
  c. control means operatively connected to said passenger detecting means and to said input of said recording means, said control means including time delay means and operator-controlled switching means having a plurality of states, said control means being operative to apply a discrete signal to said input of said recording means a predetermined time after a passenger is in said vehicle unless said operator controlled switching means is in a particular one of said states; and
  d. said vehicle including transmission gear selection means and said operator-controlled switching means comprising position responsive switching means connected to said gear selection means whereby said operator controlled switching means is in said particular state when said gear selection means is in position corresponding to a non-motion gear.

20. Apparatus according to claim 15, wherein said passenger detecting means comprises open switching means mounted in the seats of said vehicle in a manner so as to be closed when a passenger sits on the vehicle seat.

21. Apparatus according to claim 20, further including holding circuit means operatively connected to said passenger detecting switching means and to said control means for insuring that said control means is set in operation when a passenger sits on the vehicle seat.

22. Apparatus according to claim 15, further including means operatively connected to said control means and to said recording means for selectively preventing operation of said recording means to allow for flat rate fares and including means recording the number of times flat rate operation is selected.

23. A monitoring system for a vehicle for hire having a meter for registering the fare, said monitoring system comprising:
  a. passenger detecting means for signalling the presence of a passenger in the vehicle;
  b. recording means having an input and operative to provide a record of each time a discrete input signal is applied thereto;
  c. control means operatively connected to said passenger detecting means and to said input of said recording means, said control means including time delay means and operator-controlled switching means having a plurality of states, said control means being operative to apply a discrete signal to said input of said recording means a predetermined time after a passenger is in said vehicle unless said operator controlled switching means is in a particular one of said states;
  d. selector means for initiating flat rate fare operation;
  e. circuit means operatively connected to said selector means and to said recording means for circumventing operation of said recording means in response to operation of said selector means; and
  f. flat rate counter means operatively connected to said selector means for providing a record of the number of times flat rate operation is selected.

24. Apparatus according to claim 23 further including means operatively connecting said circuit means to said passenger detecting means in a manner such that said circuit means can be operated only when said detecting means signals the presence of a passenger in the vehicle.

25. A monitoring system for a vehicle for hire having a meter for registering the fare, said monitoring system comprising:
  a. passenger detecting means for signalling the presence of a passenger in the vehicle;
  b. recording means having an input and operative to provide a record of each time a discrete input signal is applied thereto;
  c. control means operatively connected to said passenger detecting means and to said input of said recording means, said control means including time delay means and operator-controlled switching means having a plurality of states, said control means being operative to apply a discrete signal to said input of said recording means a predetermined time after a passenger is in said vehicle unless said operator controlled switching means is in a particular one of said states; and
  d. said control means comprising signal generator means having one input connected to said passenger detecting means and another input connected to said operator controlled switching means, said signal generator providing an output signal when both said detecting means signals the presence of a passenger and when said switching means is in another one of said states, said time delay means comprising timer means having an input connected to the output of said signal generator means, and operative to provide an output signal a predetermined time after a signal is applied to the input thereof, coincidence gating means having a pair of inputs connected to the outputs of said timer means and said signal generator means, and means coupling the output of said gating means to the input of said recording means whereby said gating means allows application of an input signal to said recording means unless said operator controlled switching means is placed in said particular one of said states within a predetermined time after a passenger is in said vehicle as determined by said timer means.

26. Apparatus according to claim 25 wherein said recording means comprises counter means and wherein said coupling means includes means generating pulse signals at a predetermined rate whereby said counter provides an indication of the length of time signals are applied to said counter.

27. Apparatus according to claim 25 further including means operatively connected to said coupling means for selectively preventing operation of said recording means to allow for flat rate fares and including means recording the number of times flat rate operation is selected.

28. An electrical monitoring system for a vehicle for hire as defined in claim 15, further including a passenger seat, said passenger detecting means adapted to be disposed in said seat and establishing a predetermined electrical condition in a portion of said monitoring system operatively associated with said meter when a passenger sits on the seat, said passenger detecting means comprising:
 a. switching means mounted in operative relation to said seat, said switching means having a pair of switch contacts and biasing means normally urging said contacts into a closed position; and
 b. a flexible connecting line operatively connected at one end to said switch contacts and at the other end to said passenger seat, said connecting line being normally taut and holding said switch contacts in an open position whereby when a passenger sits on said seat said connecting line is slackened thereby allowing said switch contacts to close.

29. Apparatus according to claim 28 wherein said flexible connecting line includes a plurality of portions at said other end operatively connected to a plurality of locations on said seat.

30. Apparatus according to claim 28 wherein said seat includes an inner body of material and an outer cover and wherein said flexible connecting line extends through said inner material and is connected to a plurality of sensor elements at spaced locations along said seat.

31. A monitoring system for a vehicle for hire having a meter for registering the fare, said monitoring system comprising:
 a. condition responsive detecting means operated in response to tampering and other unauthorized activity with said vehicle, the meter and the monitoring system, said detecting means comprising a plurality of normally open mechanically operated switching means positioned so as to be closed in response to movement of components of said meter, said vehicle and said monitoring system during tampering therewith;
 b. signal generating means having an input connected to said detecting means and operative to produce an output signal in response to operation of said detecting means;
 c. alarm means; and
 d. means for coupling the output of said signal generating means to said alarm means, said coupling means including holding circuit means and reset means whereby once tampering or authorized activity is detected operation of said alarm means continues until said reset means is operated.

* * * * *